United States Patent

[11] 3,631,233

[72] Inventor Joseph V. McKenna
Franklin Lakes, N.J.
[21] Appl. No. 848,519
[22] Filed Aug. 8, 1969
[45] Patented Dec. 28, 1971
[73] Assignee The Singer Company
New York, N.Y.

[54] BINARY VECTOR ROTATOR AND ANGLE-TO-BINARY CONVERTER
11 Claims, 7 Drawing Figs.

[52] U.S. Cl. .......... 235/186, 235/189, 340/347 AD
[51] Int. Cl. .......... G06g 7/22, H03k 13/17
[50] Field of Search .......... 235/186, 189, 193, 194, 197, 150–153; 330/26, 30; 340/347; 328/14, 118

[56] References Cited

UNITED STATES PATENTS

| | | | |
|---|---|---|---|
| 3,457,394 | 7/1969 | Grado | 235/186 X |
| 3,480,946 | 11/1969 | Di Meo | 340/347 |
| 3,500,029 | 3/1970 | Schwartzenberg et al. | 235/193 X |

*Primary Examiner*—Eugene G. Botz
*Assistant Examiner*—Jerry Smith
*Attorneys*—S. A. Giarratana and S. Michael Bender

ABSTRACT: This specification discloses an analogue system comprising an operational amplifier, a plurality of analogue hold amplifiers, which operate to store an applied signal voltage level, a plurality of precision resistors and a programming means which controls successive summing operations in the operational amplifier and the storage of the resulting sums in the analogue hold amplifiers to carry out the desired conversion of the analogue input signals to a desired digital number. Alternatively, the system can be operated to carry out a desired rotation of a vector represented by analogue signals through a digitally represented angle.

*INVENTOR*
JOSEPH V. McKENNA

*BY* S. A. Giarratana
*ATTORNEY*

INVENTOR
JOSEPH V. McKENNA

BY

ATTORNEY

INVENTOR
JOSEPH V. McKENNA

BY S. A. Giarratana
ATTORNEY

INVENTOR
JOSEPH V. McKENNA

BY [signature]
ATTORNEY

BINARY VECTOR ROTATOR AND ANGLE-TO-BINARY CONVERTER

BACKGROUND OF THE INVENTION

This invention relates to resolver and vector rotation systems; and more particularly, to a resolver system in which the sine and cosine of an angle are converted to binary signals representing the angle, and a vector rotation system by which an input vector represented by its sine and cosine components can be rotated through a predetermined angle represented digitally.

In navigational and guidance systems, it is frequently desirable to represent an angle digitally. This representation normally takes the form in which the most significant digit represents 180° and each succeeding digit of lesser significance represents one half as much as the immediately preceding digit of greater significance. The number of degrees represented by such a binary number can be determined by adding up the number of degrees represented by each binary one in the binary number. For example, the number of degrees represented by each binary one in the binary number 1010010111 is indicated in the following table, in which the digits of the numbers are listed in their order of significance and the number of degrees represented by each binary one in the number are listed opposite such binary one.

TABLE I

| Binary Number | Degrees |
|---|---|
| 1 | 180.0° |
| 0 | 0.0° |
| 1 | 45.0° |
| 0 | 0.0° |
| 0 | 0.0° |
| 1 | 5.625° |
| 0 | 0.0° |
| 1 | 1.40625° |
| 1 | 0.703125° |
| 1 | 0.3515625° |

The sum of degrees shown in the second column is equal to 233.0859375°, which is the number of degrees represented by the binary number.

The system of the present invention will convert analogue signals representing the sine and cosine of an input angle to the binary number, which represents such angle. Also, the system of the present invention can be used to rotate a vector represented trigonometrically by analogue signals proportional to the sine and cosine components through a predetermined digitally represented angle.

SUMMARY OF THE INVENTION

The system of the present invention comprises an operational amplifier, a plurality of analogue hold amplifiers, which operate to store an applied signal voltage level, a plurality of precision resistors and a programming means, which controls successive summing operations in the operational amplifier and the storage of the resulting sums in the analogue hold amplifiers to carry out the desired conversion of the analogue input signals to a desired digital number. Alternatively, the system can be operated to carry out a desired rotation of the vector represented by the analogue signals through a digitally represented angle.

Accordingly, an object of the present invention is to provide an improved system for converting analogue signals representing an input angle to a digital number representing such angle.

Another object of the present invention is to provide an improved system for rotating a vector represented by analogue signals through a predetermined angle.

Further objects and advantages of the present invention will become readily apparent as the following detailed description of the present invention unfolds.

DETAILED DESCRIPTION OF THE PREFERRED EMBODIMENTS

The analogue signals representing the sine and cosine of an angle may be thought of as representing a vector having a magnitude of unity positioned at such angle from a reference angular position. The system of the present invention performs the operation of converting the analogue signals to a digital number by first determining in which quadrant the vector represented by the analogue signals lies. This determination is accomplished by examining the signs or polarities of the two input analogue signals representing the input angle, which shall be referred to as $\theta$. This operation will provide an indication of the first two digits of the binary number. If both the sine and cosine are positive, then the vector is in the first quadrant and the angle is less than 90°. Accordingly, the first two digits of the binary number representing the angle will be zero. If the sine is positive but the cosine is negative, then the vector will be in the second quadrant meaning that the angle is between 90° and 180°. Accordingly, the first digit of the binary number will be zero and the second digit will be one. If both the sine and cosine are negative, then the vector will be in the third quadrant, meaning that the angle is between 180° and 270°. Accordingly, the first digit will be one and the second digit will be zero. If the sine of the angle is negative and the cosine is positive, then the vector will be in the fourth quadrant, meaning that the angle is between 270° and 360°, so that both the first and second digits of the binary number will be one. To facilitate the description, an angle shall be described as being in the quadrant in which a vector positioned at that angle would be.

Figure 1:
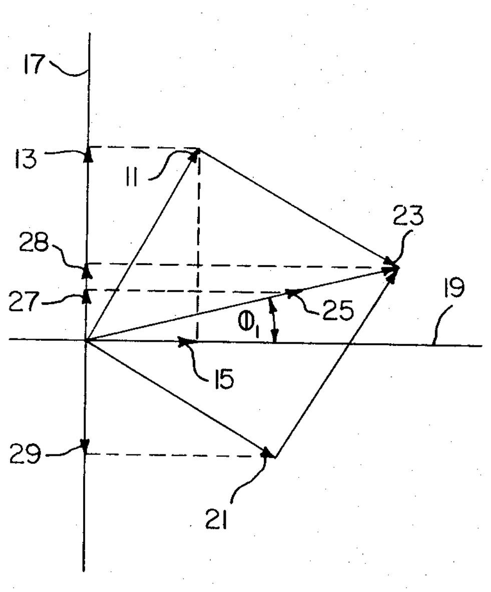
FIGS. 1–3 are vector diagrams illustrating the operation of the system of the present invention.
Figure 2:
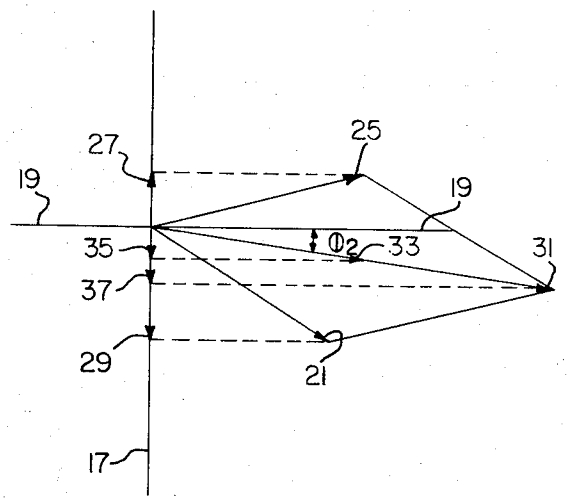
Figure 3:
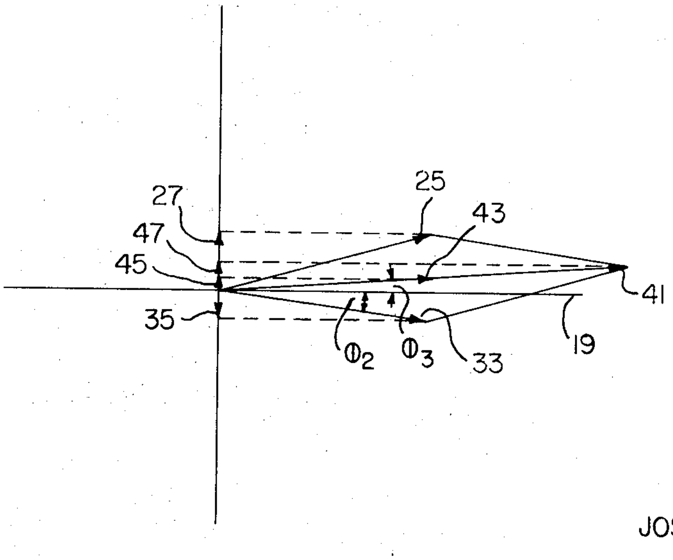

The vector diagrams of FIGS. 1–3 illustrate how the system of the present invention determines the remaining digits of the binary number representing the input angle $\theta$, which is applied to the system by signals representing the sine and cosine thereof. The vector 11 is shown in FIG. 1 positioned at the input angle $\theta$ to be converted to a digital number. In the example illustrated in FIGS. 1–3, the input angle $\theta$ is less than 90°, so the vector 11 is in the output binary number to be calculated are zero from the fact that both sine $\theta$ and cosine $\theta$ are positive. The vector 11 is of unity magnitude so the input signals representing the sine and cosine of $\theta$ are corresponding to the projections 13 and 15 of the vector 11 on the vertical and horizontal axes 17 and 19, respectively. The system of the present invention, in effect, will first rotate the vector 11 through 45° toward the horizontal axis by adding a vector 21 displaced 90° from he vector 11 in the direction toward the axis 19. The vector 21, like the vector 11, has a length of unity. The vector 23, which results from the addition of the vectors 11 and 21, is then normalized, by which is meant shortening the vector 23 to unity length to provide the vector 25. The resulting vector 25 will be displaced from the vector 11 by 45°, and thus, in effect, amounts to a rotation of the vector 11 through 45° toward the horizontal axis 19.

If the resulting vector had fallen in the fourth quadrant below the horizontal axis 19, this would mean that the input angle would have been less than 45°, and that, therefore, the third digit of the binary number would be zero. The fact that the resulting vector 25 falls in the first quadrant above the horizontal axis 19 indicates that the input angle $\theta$ is greater than 45°, and accordingly, the third digit of the binary number representing the input angle $\theta$ is one.

The quadrant in which the resulting vector 25 falls can be determined by examining the polarity of the sine of the angle $\phi_1$ of the resulting vector 23. If the sine of $\phi_1$ were negative, then the vector 23 would be in the fourth quadrant and the third digit of the binary number would be zero. If, as in the actual example, the sine of the angle $\phi_1$ is positive, the vector 23 falls in the first quadrant and the third digit is one.

The projection 27 of the vector 25 on the vertical axis 17 represents the sine of the angle $\phi_1$. The projection 27 will be equal to the projection 28 of the vector 23 on the vertical axis 17 times the normalizing factor by which the vector 23 is multiplied to shorten it to unity length. This normalizing factor is 1/(2cos 45°). The projection 28 will be equal to the algebraic sum of the projection 13 of the vector 11 and the projection 29 of the vector 21 on the vertical axis. Since he projection 13 equals the sine of $\theta$ and the projection 29 equals the sine of $\theta$–90°, the expression for the projection 27 or the sine $\phi_1$ can be written as follows:

(1)

$$\sin \phi_1=\sin (\theta-45°)=\frac{1}{2 \cos 45°} [\sin \theta+\sin (\theta-90°)]$$

The system of the present invention computes the value for the sine of $\phi_1$ from the equation (1) given above, and then examines this quantity to determine whether it is positive or negative to determine the third digit of the binary number representing the input angle $\theta$. The system can readily make the desired computation from the applied input signals representing sine $\theta$ and cosine $\theta$ since sine ($\theta$–90°) is equal to –cosine $\theta$.

After determination of the third digit is made in this manner, the system will rotate the resulting vector 25 through 22.5° toward the horizontal axis by adding a vector the resulting vector 25 displaced therefrom by 45° in a direction toward the horizontal axis, and normalizing the resulting vector. This vector rotation is illustrated in FIG. 2, which shows that the vector added to the vector 25 displaced therefrom by 45° is the same vector 21 that was added to the original vector 11.

The vector resulting from the addition of the vectors 25 and 21 is designated by the reference number 31, which after being normalized to unity length becomes the vector 33. The fourth digit of the binary number to represent the input angle $\theta$ is determined from the quadrant in which the vector 33 falls. If the vector 33 had fallen in the first quadrant, then $\phi_1$ would have been greater than 22.5° and, accordingly, the fourth digit would have been one. If the vector 33 falls in the fourth quadrant, as it does in the illustrated example, this means that $\phi_1$ is less than 22.5° and, accordingly, the fourth digit is zero.

As in the case of the third digit, the quadrant of the vector 33 is determined by determining whether the sine of $\phi_2$, the angle of the vector 33 is positive or negative. The projection 35 of the vector 33 on the vertical axis will be equal to the sine of $\phi_2$. The normalizing factor, by which the vector 31 must be multiplied to obtain the vector, is 1/(2 cos 22.5°). Accordingly, the projection 35 will be equal to 1/(2 cos 22.5°) times the projection 37 of the vector 31 on the vertical axis 17. The projection 37 will equal the algebraic sum of the projection 27 of the vector 25, and the projection 29 of the vector 21 on the vertical axis. The projection 27, as pointed out above, is equal to the sine of $\phi_1$, and the projection 29 of the vector 21 will be equal to the sine of $\phi_1$–45°. Accordingly, the projection 35 on the sine of $\phi_2$ can be expressed as follows:

(2)

$$\sin \phi_2=\sin (\phi_1-22.5°)=\frac{1}{2 \cos 22.5°} [\sin \phi_1 +\sin(\phi_1-45°)]$$

Since $\phi_1$ equals $\theta$–45°, the sine of $\phi$–45° will equal the sine of $\theta$–90°, or in other words, will equal minus the cosine of $\theta$. Accordingly, the system of the present invention can readily determine the sine of $\phi_2$ from the input signal representing the cosine of $\phi$ and the value determined for the sine of $\phi_1$ in the calculation of the third most significant digit.

To determine the fifth digit of the output binary number, the system of the present invention, in effect, rotates the vector 33 through 11.25° toward the horizontal axis 19. This is accomplished by adding a vector of unity length to the vector 33 displaced therefrom by 22.5° and then normalizing the resulting vector. This vector rotation by vector addition is illustrated in FIG. 3. Since the vector 25 is displaced from the vector 33 by 22.5° toward the horizontal axis, the vector 33 is rotated through 11.25° by adding the vector 25 to the vector 33 to produce the resulting vector 41, which when normalized becomes the vector 43 positioned at the angle $\phi_3$. If the vector 43 had fallen in the second quadrant below the axis 19, this would have meant that the angle $\phi_1$ was less than 11.25° and, accordingly, the fifth digit in the output binary number would have been zero. If the vector 43 falls in the first quadrant, as it does in the illustrated example, this means that the angle $\phi_1$ is greater than 11.25° and, accordingly, the fifth digit in the output binary number is one. As in the case of the third and fourth binary digits, the quadrant in which the vector 43 falls is determined by examining the sine of $\phi_3$ and determining whether it is positive or negative. The sine of $\phi_3$ is represented by the projection 45 of the vector 43 on the vertical axis 17. This projection will be equal to 1/(2 cos 11.25°) times the projection 47 of the vector 41 on the vertical axis 17. The projection 47 will be equal to the algebraic sum of the projection 35 of the vector 33 and the projection 27 of the vector 25. Accordingly, the following equation can be written for the sine of $\phi_3$:

(3)

$$\sin \phi_3=\sin (\phi_2+11.25°)=\frac{1}{2 \cos 11.25°} [\sin \phi_2 +\sin(\phi_2+22.5°)]$$

Since $\phi_2$+22.5° equals $\phi_1$, the system at this point will already have computed and have stored a value equal to sine ($\phi_2$+22.5°) in the form of the value representing sine $\phi_1$. Accordingly, the system can readily carry out the computation of equation (3) by adding the values representing sine $\phi_2$ and sine $\phi_1$ together and multiplying the resulting sum times 1/(2 cos 11.25°).

Each successive binary digit in the output binary number is determined in a similar manner, each time rotating the resulting vector from the preceding rotation toward the horizontal axis through an angle equal to half the previous rotation. This will always amount to adding the vector to a vector which has previously been utilized so the sine of the angle of the vector to be added will be available. Accordingly, the sine of the angle of the new vector can readily be computed. The system can be described as solving one of the two following general equations for each successive binary digits:

(4)

$$\sin \phi_n=\sin(\phi_{n-1}-\Delta_n) =\frac{1}{2 \cos \Delta_n} [\sin \phi_{n-1}+\sin (\phi_{n-1}-2\Delta_n)]$$

(5)

$$\sin \phi_n=\sin (\phi_{n-1}+\Delta_n) =\frac{1}{2 \cos \Delta_n} [\sin \phi_{n-1}+\sin (\phi_{n-1}+2\Delta_n)]$$

Equation (4) is used if the sine $\phi_{n-1}$ is positive in order to, in effect, rotate the vector at angle $\phi_n$ through the angle $\Delta_n$ toward the horizontal axis. Equation (5) is used if sine $\phi_{n-1}$ is negative, in order to rotate the vector at angle $\phi_n$ toward the horizontal axis. For each successive digit, the angle $\Delta$ through which the vector is rotated, is divided in half. Since $\Delta_1$ equals 45°, $\Delta_n$ will equal $90°/2^n$. After each successive determination is made for the sine of $\phi$, the corresponding output digit is assigned the value one or zero depending on whether the sine of $\phi$ is positive or negative. Values representing the quantity sine $\phi_{n-1}$ plus or minus $2\Delta_n$ are always available since this quantity will always be equal to a value which has been previously computed or be equal to sine $\theta$ or minus cos $\theta$.

It will be noted that each succeeding vector is determined by adding the preceding vector to one of the two vectors added together to provide the preceding vector. The particular vector to which such succeeding vector is added is the one in the opposite quadrant therefrom. Accordingly, each sine $\phi_n$ is determined by adding the value sine $\phi_{n-}$to one of the two values added together to obtain sine $\phi_{n-1}$. Only one of the two values added together to obtain sine $\phi_{n-1}$ will be of the opposite polarity from sine $\phi_{-1}$ and this is the value which is added to sine $\phi_{n-1}$ to obtain sine $\phi_n$.

The above-described example explains how the system determines the third and lesser significant digits when the input angle is in the first quadrant. The system operates in a similar manner in the second, third and fourth quadrants. In each quadrant, the system must provide signals of opposite polarities representing the magnitude of sine $\theta$ and cosine $\theta$. These signals are added together and multiplied by 1/(2 cos 45°) to obtain sine $\phi$, the polarity of which is detected to determine the third most significant digit. Then he system adds the value of sine $\phi_1$ to the one of the signals added together to obtain sine $\phi_1$, which signal is of the opposite polarity from sine $\phi_1$, and multiplies the resulting sum times 1/(2 cos 22.5°) to obtain sine $\phi_2$. The system then detects the polarity of sine $\phi_2$ to determine the fourth output digit. Each succeeding value of sine $\phi_n$ is determined by adding sine $\phi_{n-1}$ to the one of two values added together to obtain sine $\phi_{n-1}$, which value is of the opposite polarity from sine $\phi_{n-1}$ and multiplying the resulting sum times 1/(2 cos 90°2$^n$).

To simplify the programming of the system, it is made to always store a positive signal voltage representing the magnitude of sine $\theta$ and a negative signal voltage representing cosine $\theta$. Because of this programming, each digit determined from the polarity of sine $\phi_n$ when $\theta$ is in the first or third quadrants will be a one when sine $\phi_n$ is positive, and will be a zero when sine $\phi_n$ is negative. Conversely, the in second and fourth quadrants, each digit determined from the polarity of sine $\phi_n$ will be zero if sine $\phi_n$ is positive and will be one if sine $\phi_n$ is negative.

Figure 4:
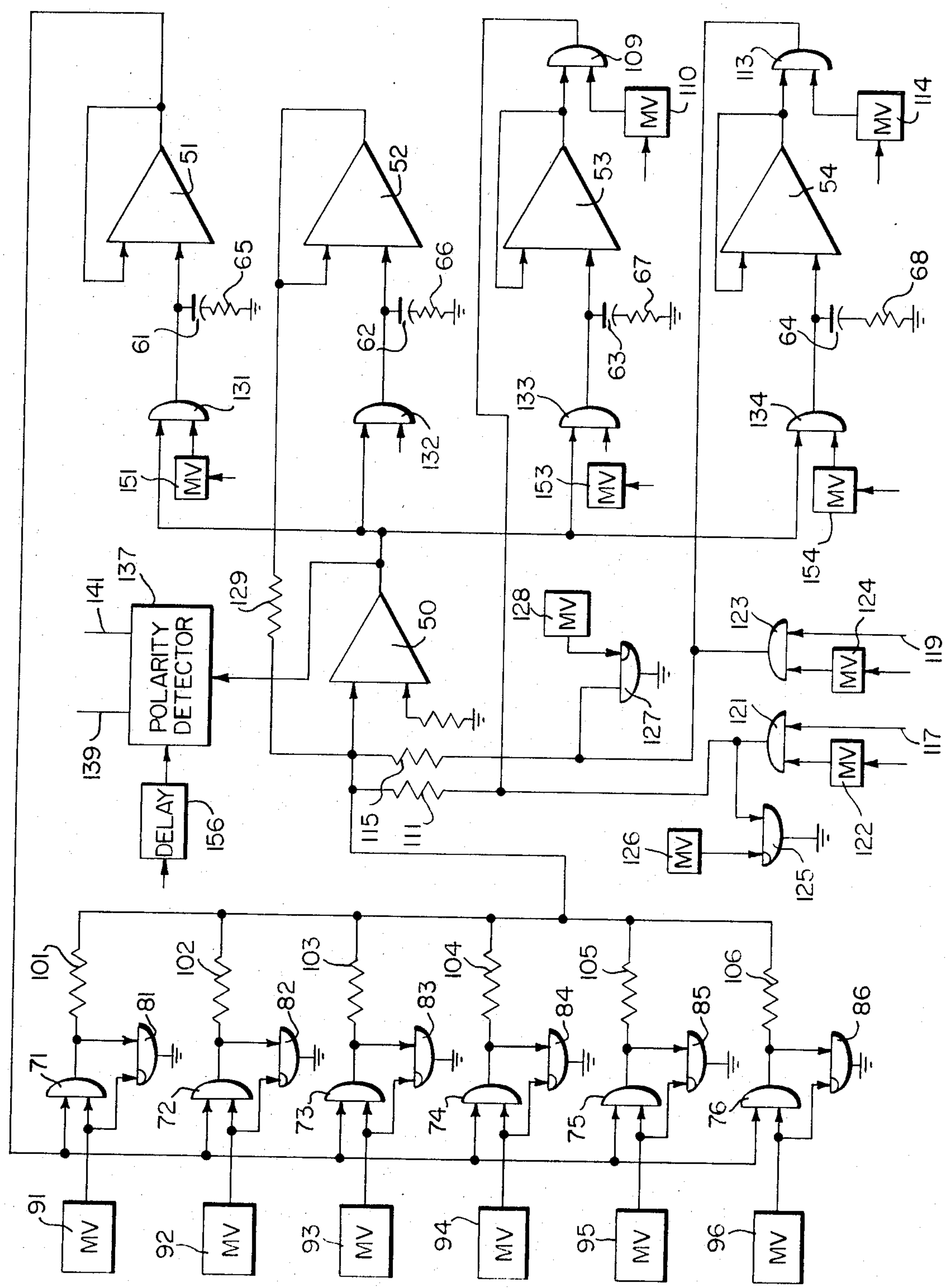
FIG. 4 illustrates the analogue system of the present invention.

As shown in FIG. 4, the system of the present invention, by which the above-described trigonometrical operations are carried out, comprises an operational amplifier 50 and four analogue hold amplifiers 51–54, which can be used to store an applied analogue signal. The analogue hold amplifiers 51–54 have associated therewith signal storage capacitors 61–64 connected in series with resistors 65–68, respectively, between the inputs of the amplifiers 51–54, respectively, and ground. The analogue signal voltage stored by one of the analogue hold amplifiers is stored on its corresponding storage capacitor and the amplifier will produce an output signal voltage equal in magnitude to the voltage applied across its storage capacitor, but of the opposite polarity. The analogue hold amplifiers each comprises a high gain summing amplifier, the output of which is summed with the signal voltage applied across its storage capacitor. Because the amplifier inverts the applied input signal and feeds back the inverted signal to be summed with the applied input signal, the output signal voltage of each of the amplifiers will very precisely follow the applied input signal voltage in magnitude. The output signal voltage of the amplifier 51 is applied to the inputs of six linear gates 71–76, each of which when enabled will pass the applied input signal to its output. The outputs of the gates 71–76 are connected to the inputs of normally enable gates 81–86, the outputs of which are connected to ground. The gates 81–86, unless disabled will each ground the output of the corresponding one of the linear gates 71–76. Monostable multivibrators 91–96 are connected to apply pulses of predetermined length to the gates 71–76, respectively, to enable the gates 71–76 and to disable the gates 81–86 in response to applied trigger pulses. When a trigger pulse is applied to one of the multivibrators 91–96, it will enable the corresponding one of he inner gates 71–76 to pass the signal applied thereto from the analogue hold amplifier 51 and will disable the corresponding one of the gates 81–86. The outputs of the linear gates 71–76 are connected to the input of the operational amplifier 50 through resistors 101–106, respectively, each of which has a different resistance value. The resistances of the resistors 101, 111, 115 and 129 are equal. The resistances of the resistors 102–106 relative to the resistance R of the resistors 101, 111, 115 and 129 are given in the following table:

TABLE II

| Resistor Reference No. | Resistance |
|---|---|
| 102 | R/(2 cos 45°) |
| 103 | R/(2 cos 22.5°) |
| 104 | R/(2 cos 11.25°) |
| 105 | R/(2 cos 5.625°) |
| 106 | R/(2 cos 2.8125°) |

The output of he analogue hold amplifier 53 is applied to the input of a linear gate 109, which when enabled will pass the applied signal voltage to its output. A monostable multivibrator 110 is connected to apply a pulse to the gate 109 to enable it for a predetermined time interval in response to an applied trigger pulse. The output of the linear gate 109 is connected through a resistor 111 to the input of the operational amplifier 50. The output of the analogue hold amplifier 54 is connected to the input of a linear gate 113, which will pass the applied signal to its output when enabled. A monostable multivibrator 114 is connected to apply a pulse to the gate 113 to enable it for a predetermined time interval in response to an applied trigger pulse. The output of the gate 113 is connected to the input of the operational amplifier 50 over resistor 115.

When the system is to be operated to convert analogue signals representing the sine and cosine of an angle to a digital number representing said angle, a signal representing the sine of the angle to be converted is applied to an input 117 and the signal representing the cosine of the angle to be converted is applied to an input 119. The input 117 is connected to a linear gate 121, which when enabled will pass the applied signal through the resistor 111 to the input of the operational amplifier 50. A monostable multivibrator 122 is connected to apply a pulse to the gate 121 to enable it for a predetermined time interval in response to an applied trigger pulse. The input 119 is connected to the input of a linear gate 123, which when enabled will pass the applied signal through the resistor 115 to the input of the operational amplifier 50. A monostable multivibrator 124 is connected to apply a pulse to the gate 123 to enable it for a predetermined time interval in response to an applied trigger pulse. The junction between the resistor 111 and the gates 109 and 121 is connected to the input of a normally enabled gate 125, which unless disabled by an applied signal connects this junction to ground. The gate 125 will be disabled by the output pulse produced by a monostable multivibrator 126 in response to an applied trigger pulse. The junction between the resistor 115 and the gates 113 and 123 is connected to a normally enabled gate 127, which unless disabled by an applied control signal will ground the junction connected to its input. The gate 127 will be disabled by the output pulse produced by a monostable multivibrator 128 in response to an applied trigger pulse. The output of the amplifier 52 is connected directly to the input of the amplifier 50 over a resistor 129. The output of the operational amplifier 50 is applied to the inputs of four linear gates 131–134, the outputs of which are connected to the inputs of the analogue hold amplifiers 51–54, respectively. Monostable multivibrators 151, 153 and 154 are provided to apply pulses of a predetermined duration to the gates 131, 133 and 134, respectively, to enable the gates 131–134 in response to an applied trigger pulse. When one of the gates 131–134 is enabled, he output signal of the operational amplifier 50 will be passed through such gate to the input of the corresponding one of the analogue hold amplifiers 51–54 to charge the corresponding one of the storage capacitors 61–64.

The output of he operational amplifier 50 is also connected to a polarity detector 137, which when strobed by an applied pulse will produce an enabling signal on an output channel 139 if the applied signal is positive and, will produce an enabling signal on an output channel 141 if the applied signal is negative. The polarity detector 137 will continue to produce the control signal on the same output channel until it is strobed again by an applied pulse and the output signal of the operational amplifier 50 has switched polarities.

The analogue hold amplifier 52 serves only to provide a compensation offset voltage to compensate for offset errors in the analogue system. At all times when the system is not being used to carry a computation, the normally enabled gates 81–86, 125 and 127 will ground all the inputs to the operational amplifier 50 except the input from the analogue old amplifier 52. The gate 132 will be enabled which will cause a voltage to be developed across the capacitor 62 to precisely compensate for the offset voltage errors developed by the system. After this offset voltage has been developed across the capacitor 62, the gate 132 will be disabled by the removal of the enabling signal therefrom and the voltage stored by the analogue hold amplifier 52 will be continuously summed during the computation processes with all the other inputs to provide a precise error correction.

To determine the polarity of the signal voltage applied at terminal 117, trigger pulses are applied to the multivibrators 122 and 126 to enable the gate 121 and disable the gate 125, and, simultaneously, a pulse is applied to the input of a delay circuit 156, which after a short delay will apply the pulse to the polarity detector 137. The enabling of the gate 121 and disabling of the gate 125 will cause the signal voltage applied to the input 117 to be applied to the input of the operational amplifier 50. The operational amplifier 50 will accordingly produce an output signal of the same polarity as that applied to input 117 when the delay circuit 156 applies the delayed pulse to the polarity detector 137. Accordingly, the polarity detector 137 will be set in accordance with the polarity the signal applied to the input 117. The polarity of this signal applied to the input 119 can be determined in a similar manner by applying trigger pulses to the multivibrators 124 and 128 and simultaneously to the delay circuit 156.

The polarity detector 137 can be set in accordance with the inverse of the signal voltage stored on the amplifier 51 by applying a trigger pulse to the multivibrator 91 simultaneously with a pulse applied to the delay circuit 156. The trigger pulse will cause the multivibrator 91 to enable the gate 71 and disable the gate 81 so that the inverse of the signal voltage stored on the amplifier 51 is applied to the input of the operational amplifier 50 through the resistor 101. As a result, when the delayed pulse is applied to the polarity detector by the delay circuit 156, the output voltage of the operational amplifier will have the same polarity as the inverse of the signal voltage stored on the hold amplifier 51. Accordingly, the polarity detector 137 will be set in accordance with the polarity of the inverse of the signal voltage stored in the old amplifier 51. The polarity detector can be set in accordance with the inverse of the polarities stored on the amplifiers 53 and 54 in similar manner by applying a pulse of the delay circuit 156 and simultaneously applying pulses to the multivibrators 110 and 126 in the case of the amplifier 53 or to the multivibrators 114 and 128 in the case of the amplifier 54.

To store the signal voltage representing the sine of the input angle $\theta$ applied at terminal 117 on one of the analogue hold amplifiers 51 or 54, trigger pulses are applied to multivibrators 122 and 126 to enable the gate 121 to disable the gate 125. If the signal voltage is to be stored on the analogue hold amplifier 51, pulses are also applied to the multivibrators 151 and 91 to enable the gates 131 and 71 and to disable the gate 81 so as to provide a feedback from the amplifier 51 to be summed with the signal voltage applied at input 117 at the input of the operational amplifier 50. This operation will cause a signal voltage to be produced across the capacitor 61 equal to the signal voltage applied at the input 117. After a settling period, the pulses produced by the multivibrators 151, 91, 122 and 126 will terminate so that the gates 131, 71 and 121 are no longer enabled and the gates 81 and 125 are no longer disabled. After this operation, signal voltage will be stored by the analogue hold amplifier 51 equal to the signal voltage applied at input 117. If the signal voltage applied at input 117 is to be stored on the hold amplifier 54, instead of triggering the multivibrators 151 and 91, multivibrators 154, 114 and 128 are triggered to enable the gates 134 and 113, and to disable the gate 127. As a result, the signal voltage applied to the input 117 will be applied across the capacitor 64. After a time period of a duration to allow for the voltages to settle, the pulses produced by the multivibrators 154, 114, 128, 122 and 126 will terminate so that the gates 134, 113 and 121 will no longer be enabled, and the gates 125 and 127 will no longer be disabled. The signal voltage applied to the input terminal 117 will then be stored on hold amplifier 54.

The signal voltage applied at input 119 can be stored on the analogue hold amplifier 51 or 53 in a similar manner by triggering the multivibrators 124 and 128 to enable the gate 123 and disable the gate 127, and either triggering the multivibrators 151 and 91 to enable the gates 131 and 71 and disable the gate 81 if the signal voltage is to be stored on the amplifier 51, or triggering the multivibrators 153, 110 and 126 to enable the gates 133 and 109 and disable the gate 125 if the signal voltage is to be stored on the analogue hold amplifier 53.

To transfer the signal voltage stored on the analogue hold amplifier 51 to the analogue hold amplifier 53 with a polarity inversion, pulses are applied to multivibrators 91, 153, 110 and 126 to enable the gates 71, 133 and 109 and disable the gates 81 and 125. As a result, the inverted value of the signal voltage stored by the hold amplifier 51 will be applied across the storage capacitor 63 and will be stored by the analogue hold amplifier 53. If it is desired to store the inverted value of the voltage stored on amplifier 51 on amplifier 54 instead of on amplifier 53, then instead of applying pulses to the multivibrators 153, 110 and 126, pulses would be applied to the multivibrators 154, 114 and 128 to enable gates 134 and 113 and disable gate 127. This signal voltage stored on the amplifier 53 can be inverted and stored on the amplifier 51 or 54 and the signal voltage stored on the amplifier 54 can be inverted and stored on the amplifier 51 or 53 in similar manner. If the signal voltage on amplifier 53 is to be inverted and stored on another amplifier, then pulses must be applied to multivibrators 110 and 126 to enable the gate 109 and disable the gate 125. If the signal voltage stored on amplifier 54 is to be inverted and stored on another amplifier, then pulses must be applied to multivibrators 114 and 128 to enable the gate 113 and disable the gate 127. If the amplifier 51 is to store the inverted signal voltage transferred from another analogue hold amplifier, then pulses must be applied to the multivibrators 51 and 91 to enable gates 131 and 71 and disable the gate 81. If the amplifier 53 is to receive and store the inverted signal voltage, then pulses must be applied to multivibrators 153, 110 and 126 to enable the gates 133 and 109 and disable gate 125. Likewise, if the amplifier 54 is to receive and store the inverted signal voltage then pulses must be applied to multivibrators 154, 114 and 128 to enable the gates 134 and 113 and disable the gate 127.

The voltages stored on any two of the three analogue hold amplifiers 51, 53 and 54 can be added together after being inverted and stored on the third analogue hold amplifier. If it is desired to add the voltage stored on the amplifier 53 and 54 and store the resulting inverted sum on the amplifier 51, then pulses must be applied to multivibrators 110, 114, 126 and 128 to cause the corresponding gates to be enabled or disabled so that the output voltages of the amplifiers 53 nd 54 are summed at the input of the operational amplifier 50. In addition, pulses must be applied to multivibrators 151 and 91 to store the resulting sum on the amplifier 51. The voltages stored on the amplifiers 51 and 53 can be added after being inverted with the resulting sum stored on the amplifier 54 by applying pulses to the multivibrators 91, 110, 126, 154, 114 and 128 to enable or disable the corresponding gates. Similarly, the inverted sum of the signal voltages stored on the amplifiers 51 and 54 can be stored on the amplifier 53 by applying pulses to multivibrators 91, 114, 128, 153, 110 and 126.

In each of the above-described operations, it will be noted that trigger pulses have been described as being applied to the multivibrator 91 to enable the gate 71 and disable the gate 81 when a signal voltage is being stored on or read out from the amplifier 51. Operations describing the use of the multivibrators 92–96 have not yet been described. Use of the multivibrator 91, selects the resistor 101, which is equal in value to the resistors 111 and 115 to be used in the summing operation at the input of the operational amplifier 50. If it is desired to multiply the signal voltage being transferred and stored on the operational amplifier 51 by a factor other than unity, then one of the multivibrators 92–97 will be used instead of the multivibrator 91 to select one of the resistors 102–107 to be used in the summing circuit at the input of the amplifier 50. For example, if it is desired to multiply the value to be stored on the amplifier 51 by 1/(2 cos 45°) instead of by unity, then a pulse will be applied to multivibrator 92 rather than multivibrator 91 in the storing operation. Similarly, the use of the multivibrators 93–96 will multiply the value being stored on the amplifier 51 by 1/(2 cos 22.5°), 1/(2 cos 11.25°), 1/(2 cos 5.625°), and 1/(2 cos 2.8125°), respectively. Thus, when it is desired to multiply the sum of the signal voltages stored on the amplifiers 53 and 54 by 1/(2 cos 45°) and store the inverted value of this sum on the amplifier 51, this operation is carried out by applying pulses to the multivibrators 110, 114, 126, 128, 151 and 92 so that the gates 109, 113, 131 and 72 are enabled and the gates 125, 127 and 82 are disabled. With the gates controlled in this manner, the capacitor 61 will be charged to a value equal to the inverse of the sum of the signal voltages stored on the amplifiers 53 nd 54 multiplied by 1/(2 cos 45°). This multiplication factor, which is applied to the the of the signal voltage on amplifiers 53 and 54, occurs because the resistance value of the resistor 102, which is connected in the feedback path for the amplifier 51 during the storing processes, is equal to 1/(2 cos 45°) times the values of the resistors 111 and 115. In a similar manner, the sum of the signal voltages stored on the amplifiers 53 and 54 may be multiplied by 1/(2 cos 22.5°), 1/(2 cos 11.25°), 1/(2 cos 5.625°) and 1/(2 cos 2.8125°) simply by selecting the appropriate end of he multivibrators 93–96. The monostable multivibrators made use of in the system shown in FIG. 4, upon being triggered, maintain the gates to which they are connected enabled or disabled for a time interval selected to be long enough for the signal voltage across the storage capacitor of the one of the amplifiers 51, 53 or 54 on which a voltage is being stored to settle to an equilibrium value. After the stored voltage has settled to an equilibrium value, the one of the gates 131, 133 or 134 which is enabled should be returned to its normal disabled condition before the remaining gates, which have been enabled or disabled, return to their normal states. Accordingly, the multivibrators 151, 153 and 154 are designed to terminate their output pulses a shorter time period after being triggered than the remaining multivibrators of the system of FIG. 4. Accordingly, after the voltage being stored on one of he amplifiers 51, 53 or 54 has settled to an equilibrium value, first the one of the gates 131, 133 or 134 corresponding to such amplifier, will become disabled and then the remaining gates, which have been enabled or disabled by output pulses from the multivibrators to which they are connected, will return to their normal disabled or enabled states. Field effect transistors preferably are used for the inner gates and for the amplification stages of the analogue hold amplifiers 51–54. This feature, together with the feature of using a very high-gain operational amplifier for the amplifier 50, results in almost negligible error contribution due to offset voltage or current of the operational amplifier, the polarity detector or the analogue hold amplifiers.

Figure 5:
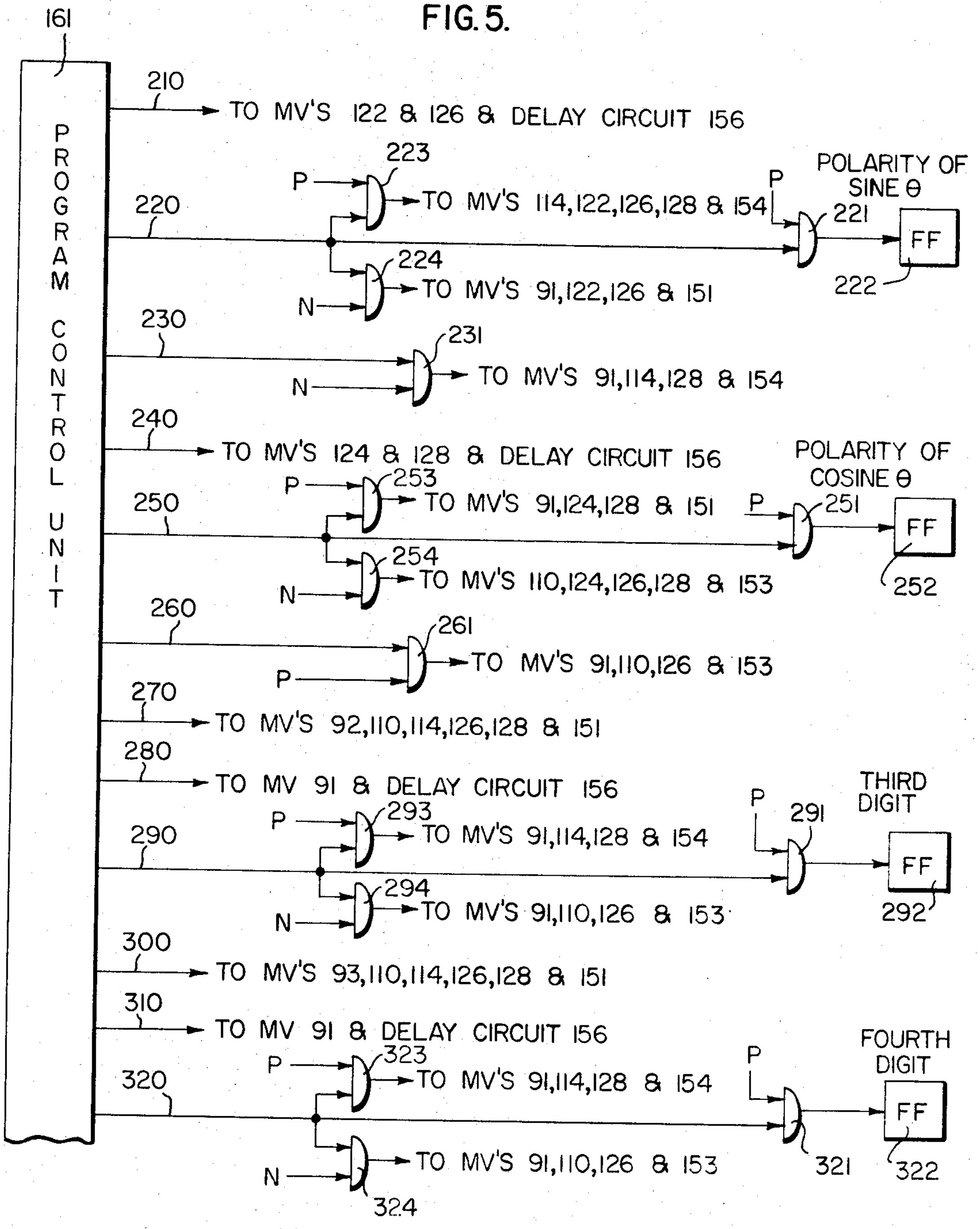
FIG. 5 illustrates a programming means for operating the system of FIG. 4 to generate a digital output signal to represent the input angle represented by the applied input signals.

FIG. 5 illustrates the programming system for automatically enabling the gates in the system of FIG. 4 in the proper sequence automatically carry out the trigonometrical operations described with reference to FIGS. 1–3 to convert the input angle represented by the sine and cosines applied to inputs 117 and 119 to a digital number representing this input angle.

To begin a computation step to generate the digital umber representing the angle $\theta$, signals representing the sine and cosine of which are applied to inputs 117 and 119, the program control 161 first removes the enabling signal normally applied to the gate 132 so that the input to the amplifier 52, which will store the compensating offset voltage, will be cut off from the operational amplifier 50. After the enabling signal has been removed from the gate 132, the program control 161 will produce trigger pulses in sequences on its output channels. These output pulses will be applied to the multivibrators of the system shown in FIG. 4 and to the delay line 56 in the proper sequence to determine the polarity of the input signals representing the sine and cosine $\theta$, and then will cause the system of FIG. 4 to perform the trigonometrical computation described with reference to FIGS. 1–3 to determine he digital number corresponding to the input angle $\theta$. The program control 161 will first produce a trigger pulse on its first output channel 210. This pulse will be applied to the multivibrators 122 and 126 and to the relay circuit 156 causing the gate 121 to be enabled and the gate 125 to be disabled and then the polarity detector 137 to be set in accordance with the polarity of the output signal of the operational amplifier 50. In this manner, the polarity detector will be set in accordance with the polarity of sine $\theta$. If sine $\theta$ is positive, the polarity detector will produce an enabling signal on the output channel 139, and if sine $\theta$ is negative, the polarity detector will produce an enabling signal on the output channel 141. The polarity detector 137 will maintain the output enabling signal until it is again pulsed by the program control 61. Following the setting of the polarity detector in accordance with sine $\theta$, the program control then will produce a trigger pulse on its second output channel 220, which output pulse is applied to a gate 221. The gate 221 is connected to be enabled by the output signal of the polarity detector 137 on channel 139. Accordingly, the gate 221 will be enabled if sine $\theta$ is positive. If the gate 221 is enabled, the trigger pulse will pass through and will sore a binary one in flip-flop 222. If the gate 221 is not enabled, the pulse will not pass through and the flip-flop 222 will remain in a zero state. In this manner, the polarity of sine $\theta$ is stored in the flip-flop 222. The trigger pulse produced on channel 220 is also applied to gates 223 and be Gate by will be enabled by the output signal of the polarity detector 237 on channel 139 indicating that the last detected polarity was positive, and the gate 234 will be enabled by a control signal produced by the polarity detector 137 on output channel 141 indicating that the last detected polarity was negative. Thus, a pulse will pass through the gate 223 if sine $\theta$ is positive, and a pulse will pass through the gate 224 if sine $\theta$ is negative. If a pulse passes through the gate 223, it will be applied to the multivibrators 122, 154 and 114 to enable the gates 121, 134 and 113 and to the multivibrators 126 and 128 to disable the gates 125 and 127. Accordingly, the signal voltage representing sine $\theta$ will be applied across the capacitance 64 and the analogue hold amplifier 54 will store this signal voltage. As a result, in response to the pulse produced on output channel 220 of the program control 161, a signal voltage representing sine $\theta$ will be stored on the analogue hold amplifier 54 if sine $\theta$ is positive. If sine $\theta$ is negative, then he pulse produced on channel 220 will pass through the gate 224 instead of 223 and this pulse will be applied to multivibrators 122, 151, 91 and 126 to enable the gates 121, 131 and 71 and disable the gates 81 and 125. As a result of the enabling of these gates, the signal voltage representing sine $\theta$ will be applied across the capacitor 61 and be stored on the analogue hold amplifier 51. Thus, if sine $\theta$ is negative, in response to the pulse produced on the channel 220, the signal voltage representing sine $\theta$ will be stored on the analogue hold amplifier 51. The program control unit 161 will then produce a trigger pulse on its next output channel 230, which will be applied to a gate 231. Gate 231 will be enabled by the output signal produced by the polarity detector 137 on channel 141 and, thus, the gate 231 will be enabled if the last sampled polarity by the polarity detector is negative. Accordingly, the pulse produced on channel 230 will pass through the gate 231 if sine $\theta$ is negative. A pulse passing through the gate 231 will be applied to the multivibrators 91, 154, 114 and 128 to enable the gates 71, 134 and 113 and disable the gates 81 and 127. As a result, the inverted value of the signal voltage stored on the amplifier 51 will be applied across the capacitor 64 nd stored on the amplifier 54. As a result, following the production of the output pulse on a channel 230, positive signal voltage representing the magnitude of sine $\theta$ will be stored on the hold amplifier 54 regardless of the polarity of the original signal representing the sine $\theta$ applied to input 117.

After the signal voltage representing sine $\theta$ has been stored on the analogue hold amplifier 54 in this manner, the program control 161 will produce a trigger pulse on its output channel 240, which will be applied to the multivibrators 124 and 128 to enable the gate 123 and disable the gate 127 and to the delay circuit 156 to strobe the polarity detector 137. Accordingly, the polarity detection will be set in accordance with the polarity of the signal voltage applied at input 119, or in other words, in accordance with the polarity of cosine $\theta$. The program control 161 will then produce a trigger pulse on its output channel 250, which will be applied to a gate 251. If the polarity detector is producing an output pulse on its output channel 139 indicating that cosine $\theta$ is positive, the gate 251 will be enabled and the trigger pulse will pass through to store one in a flip-flop 252. If cosine $\theta$ is negative, the gate 251 will not be enabled, and accordingly, the flip-flop 252 will remain in its zero state. In this manner, the flip-flop 252 is made to indicate the polarity of cosine $\theta$, storing a one if cosine $\theta$ is positive and a zero if cosine $\theta$ is negative. The pulse produced on channel 250 is also applied to gates 253 and 254. The gate 253 will be enabled to pass the applied trigger pulse if the polarity detector 137 is producing an output signal on its output channel 139, and the gate 254 will be enabled and pass the applied pulse if the polarity detector 137 is producing an output signal on its output channel 141. Accordingly, an applied trigger pulse will pass through the gate 253 if cosine $\theta$ is positive and pass through the gate 254 if cosine $\theta$ is negative. If the trigger pulse passes through the gate 253, it will be applied to the multivibrators 91, 124, 128 and 151 to enable gates 71, 123 and 131 and disable gates 81 and 127. Accordingly, the signal voltage representing cosine $\theta$ will be applied to the capacitor 61 and will be stored on the analogue hold amplifier 51 if cosine $\theta$ is positive. If the applied pulse passes through gate 254, it will be applied to multivibrators 110, 124, 126, 128 and 153 enabling gates 109, 123 and 133 and disabling gates 125 and 127. Accordingly, a signal voltage representing cosine $\theta$ will be applied to the capacitor 63 and stored on the analogue hold amplifier 53 if cosine $\theta$ is negative. Following this operation, the program control unit 161 will produce a trigger pulse on its output channel 260, which trigger pulse will be applied to a gate 261. The gate 261 will be enabled by the output signal of the polarity detector 137 on channel 139 and, accordingly, will be enabled if cosine $\theta$ is positive. If the trigger pulse passes through the gate 261, it will be applied to the multivibrators 91, 110, 126 and 153 enabling the gates 71, 109 and 133 and disabling the gates 81 and 125 so that the signal voltage stored on the analogue hold amplifier 51 is inverted and stored on the analogue hold amplifier 53. Thus, if the cosine $\theta$ is negative, it is stored on the amplifier 53, and if cosine $\theta$ is positive, it is first stored on the amplifier 51 and then inverted and stored on the amplifier 53 so that a negative signal voltage equal in magnitude to cosine $\theta$ is stored on the amplifier 53 regardless of the polarity of cosine $\theta$. Thus, after the program control unit has produced the pulse on channel 260, a positive signal voltage representing the magnitude of sine $\theta$ will be stored on the analogue hold amplifier 54, and a negative signal voltage representing the magnitude of cosine $\theta$ will be stored on the analogue hold amplifier 53.

After the values of sine $\theta$ and cosine $\theta$ are stored in this manner, the program control unit 161 will produce trigger pulse on its output channel 270, which trigger pulse will be applied to multivibrators 92, 110, 114, 126, 128 and 151, thus enabling the gates 72, 109, 113 and 131 and disabling the gates 82, 125 and 127. As a result, the output signal voltages of the analogue hold amplifiers 53 and 54 will be summed at the input of the operational amplifier 50 and the sum of these voltages will be stored on the analogue hold amplifier 51 after being multiplied by a factor determined by the feedback resistance 102. Since the resistance of the feedback resistor 102 is R/(2 cos 45°), the signal voltage stored on the amplifier 51 will equal the difference between the values of sine $\theta$ and cosine $\theta$ multiplied times 1/(2 cos 45°). Thus, the value of the signal voltage stored on the amplifier 51 will represent the sine of the resulting angle $\phi_1$, after the vector at input angle $\theta$ has been rotated 45° toward the horizontal axis and the polarity of the signal voltage will provide an indication of whether or not the 45° rotation has resulted in the vector being shifted to the opposite side of the horizontal axis, and accordingly, will indicate whether the third digit of the output digital number is a one or a zero. If the angle $\theta$ is in the first quadrant, then the value representing sine $\theta$ would have been stored in the amplifier 54, and the value representing cosine $\theta$ would have been inverted and then stored in the amplifier 53 as has been described above. The value representing the sum of these signal voltages multiplied by 1/(2 cos 45°), which is stored on the amplifier 51, is inverted, but the output signal voltage of the amplifier 51 will be reinverted. Accordingly, if $\theta$ is in the first quadrant, then a positive output signal voltage from the amplifier 51 will indicate that the third digit is one and a negative output signal voltage of the amplifier 51 will indicate that the third digit is zero. Similarly, a positive output signal voltage of the amplifier 51 will represent a one and a negative output signal voltage of the amplifier 51 will represent a zero if $\theta$ is in the third quadrant, in which case both sine $\theta$ and cosine $\theta$ would be negative. However, if $\theta$ is in the second or fourth quadrants, then a positive output signal voltage from the amplifier 51 will mean that the third digit is a zero and a negative output signal voltage will mean that the third digit is a one. The reason this inversion occurs is due to the fact that a positive signal voltage representing the magnitude of sine $\theta$ is stored initially on the amplifier 51, and a negative signal voltage representing the magnitude of cosine $\theta$ is initially stored on the amplifier 54 regardless of the actual polarities of the signal voltages. After the signal voltage has been stored on the analogue hold amplifier 51, as a result of the output pulse produced on channel 270, the program control unit 61 will produce a trigger pulse on output channel 280, which trigger pulse will be applied to the multivibrator 91 to enable the gate 71 and disable the gate 81 and to the delay circuit 156 to strobe the polarity detector 137. Accordingly, a polarity detector 137 will be set in accordance with the polarity of the output signal voltage of the amplifier 51, and accordingly, in accordance with the value of the third digit. The program control unit 161 then produces a trigger pulse on output channel 290, which trigger pulse is applied to a gate 291. The gate 291 will be enabled and pass the trigger pulse if the polarity detector 137 has detected a positive signal voltage. A signal voltage passing through the gate 291 will store a one in a flip-flop 292. Accordingly, the flip-flop 292 will store a one if the output signal voltage of the amplifier 51 is positive and will remain in the zero state if the output signal voltage of the amplifier 51 is negative. Thus, if $\theta$ is in the first or third quadrants, the flip-flop 292 will correctly represent the third most significant digit of the output digital number. If $\theta$ is in the second or fourth quadrant, then a one stored in the flip-flop 292 will mean that the third most significant digit is a zero and zero stored in the flip-flop 292 will mean that the third most significant digit is a one.

The pulse produced on channel 290 by the program control unit 161 is also applied to gates 293 and 294. The gate 293 will be enabled and pass the applied trigger pulse if the last sensed polarity by the polarity detector 137 is positive and the gate 294 will be enabled and pass the applied trigger pulse if the last sensed polarity by the polarity detector is negative. A trigger pulse passing through the gate 293 will be applied to the multivibrators 91, 114, 128 and 154 to enable the gates 71, 113 and 134 and disable the gates 81 and 127 so that the signal voltage stored on the analogue hold amplifier 51 will be applied to the capacitor 64 and stored on the analogue hold amplifier 54. Thus, if the output signal voltage of the analogue hold amplifier 51 is positive, it will be transferred to and stored on the analogue hold amplifier 54. A pulse passing through the gate 294 is applied to multivibrators 91, 110, 126 and 153 to enable gates 71, 109 and 133 and disable gates 125 and 81 so that the output signal voltage of the analogue hold amplifier 51 is applied to the capacitor 63 and stored on the analogue hold amplifier 53. Thus, if the output signal voltage of the analogue hold amplifier 51 is negative, it will be transferred to and stored on the analogue hold amplifier 53. Accordingly, when a pulse is produced on the output channel 290, the signal voltage representing the sine of $\phi_1$ will be transferred to the analogue hold amplifier 54 if this signal voltage is positive, and it will be transferred to the analogue hold amplifier 53 if it is negative. Thus, the signal voltage representing sine $\phi_1$ will replace the one of the signals stored on amplifiers 53 and 54, which is of the same polarity as sine $\phi_1$. The program control unit 161 next produces a trigger pulse on output channel 300, which is applied to multivibrators 93, 110, 114, 126, 128 and 151 to enable gates 73, 109, 113 and 131 and to disable gates 83, 125 and 126 to cause the signal voltages stored on the amplifiers 53 and 54 to be added together and multiplied by the factor 1/(2 cos 22.5°) with the resulting sum inverted and stored on the analogue hold amplifier 51. In this manner, the signal voltage representing the value sine $\phi_1$ is added to the one of the two signal voltages representing sine $\theta$ and cosine $\theta$, which signal voltage is of the opposite polarity from sine $\phi_1$. Thus, the signal voltage stored on the amplifier 51 will be equal to sine $\phi_2$ inverted. Since the output signal voltage from the amplifier will be inverted from the signal voltage stored thereon, the output signal voltage of the amplifier 51 will represent sine $\phi_2$. The program control unit next produces an output pulse on channel 310, which is applied to multivibrator 91 and delay line 156 to set the polarity detector 137 in accordance with the polarity of the output signal of the amplifier 51. The program control unit next produces an output pulse on channel 320, which pulse is applied to a gate 321. If the last detected polarity by the polarity detector 137 is positive, the pulse produced on channel 320 will pass through the gate 321 and store a one in a flip-flop 322. If the gate 321 is not enabled when the trigger pulse is applied thereto, the flip-flop 322 will remain in its zero state. In this manner, the flip-flop 322 is set in accordance with the polarity of sine $\phi_2$, and thus, is set in accordance with the fourth most significant digit of the output binary number. The pulse produced on channel 320 is also applied to gates 323 and 324. The gate 323, being enabled by the output on channel 139 from the polarity detector 137, will be enabled if sine $\phi_2$ is negative. If the gate 323 is enabled, the applied trigger pulse will pass through to multivibrators 91, 114, 128 and 154 to cause the output signal voltage of the amplifier 51 representing sine $\phi_2$ to be stored on the amplifier 54. If the applied trigger pulse passes through the gate 324, it will be applied to multivibrators 91, 110, 126 and 153 to cause the output signal voltage of the amplifier 51 to be stored on the amplifier 53. In this manner, the signal voltage representing sine $\phi_2$ is stored on the amplifier 54 if it is positive and is stored on the amplifier 53 if it is negative. Thus, the signal voltage representing sine $\phi_2$ will replace the one of the two signal voltages on amplifiers 53 and 54, which is the same polarity as the sine $\phi_2$ so that during the next step of the operation, the signal voltage representing sine $\phi_2$ can be added to the end of the two values on the amplifiers 53 and 54, which is the opposite polarity therefrom.

The succeeding values of sine $\phi_n$ are caused to be computed in a similar manner by the program control unit 161 by producing trigger pulses on succeeding output channels thereof. Each value of sine $\phi_n$ requires trigger pulses in succession on a group of three succeeding output channels. The first output pulse on the first channel of a group of three causes the signal voltages stored on the amplifiers 53 and 54 to be added together, multiplied by an appropriate factor and stored on the amplifier 51. The next output pulse produced on the next channel of a given group causes the polarity detector to be set in accordance with the polarity of the output signal of the amplifier 51 and the third output pulse on the last channel of a given group causes a flip-flop to be set in accordance with the polarity of the output signal of the amplifier 51 and causes the output signal voltage of the amplifier 51 to be stored on one of the amplifiers 53 and 54 in accordance with its polarity. In each succeeding summation of the signal voltages on the amplifiers 53 and 54, the trigger pulse provided by the program control unit is applied to the next one of the multivibrators 92–96 in sequence to select the correct value of resistance in order to multiply the signal voltage being stored on the amplifier 51 by the correct factor. This operation continues until the summation occurs in which a trigger pulse is applied to the multivibrator 96. In each succeeding summation thereafter, a pulse will be applied to the multivibrator 96 to select the desired multiplication factor in accordance with the value of the resistor 106. This operation results in a good approximation for the determination of the succeeding digits because the multiplication factor provided by the resistor 106, 1/(2 cos 2.8125°), will be very close to one-half and the factor which should be multiplied times each succeeding summation will be between 1/(2 cos 2.8125°) and one-half.

In this manner, a flip-flop corresponding to each output digit is set in accordance with the polarity determined for sine $\phi$. As pointed out above, if the input angle $\theta$ is in the first or third quadrants, then positive values for sine $\phi$ will indicate that the corresponding digit is one and negative values for sine $\phi$ will indicate that the corresponding digit is zero. Accordingly, the flip-flops corresponding to the third and lesser significant digits will store the correct digital values for the output digital number if the input vector is in the first or third quadrants, or in other words, if the flip-flops 222 and 252 both store ones or both store zeros. Conversely, the flip-flops corresponding to the third and less significant digits will store the inverse of the correct digital values if $\theta$ is in the second or fourth quadrants, or in other words, if one of the flip-flops 222 and 252 stores a one and the other stores a zero.

Figure 6:
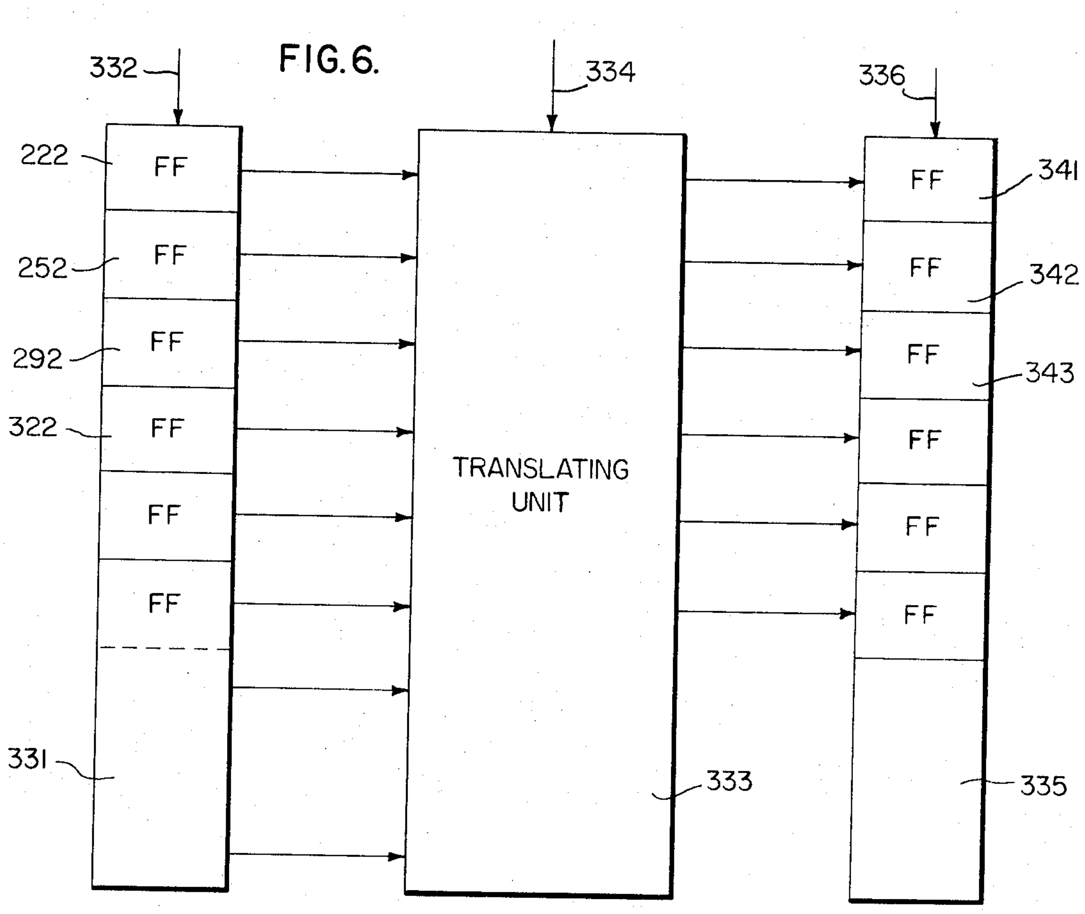
FIG. 6 is a block diagram illustrating how the system performs a final conversion to the output digital number representing the input angle.

As illustrated in FIG. 6, the flip-flops 222, 252, 292 and 322 and the flip-flop corresponding to less significant digits, each set in accordance with the polarity of sine $\phi$ form a register designated by the reference number 331. The program control 161, prior to producing pulses on its output channels 210, 220 et cetera, applies a trigger pulse to the register 331 over input channel 332 to set all of the flip-flops of the register 331 to their zero states. Thus, each of the flip-flops of the register 331 will initially be in their zero states ready to be set in their one states or left in their zero states in accordance with the polarities determined for each successive value of sine $\phi$. Output signals representing the digits stored in the flip-flops of the register 331 are applied to a translating circuit 333, which upon receiving a trigger pulse from the program control unit 161 on channel 334 will apply signals to flip-flops of a register 335 to set the flip-flops of the register 335 in accordance with the output digital number of the system. When the last flip-flop of the register 331 has been set in accordance with the polarity of the corresponding value of sine $\phi$, the program control 161 will first apply a trigger pulse to the register 335 over channel 336 to set all the flip-flops thereof to their zero states and then will apply a trigger pulse to the translating unit 333 to cause it to set the flip-flops of the register 335 in accordance with the output digital number. The first flip-flop 341 of the register 335, which will store the most significant digit of the output number, will be set merely in accordance with the inverse of the digit stored in he flip-flop 222 in response to the trigger pulse applied over channel 334 to the translating unit 333. Thus, if sine $\theta$ is positive, the flip-flop 341 of register 335 will be left in its zero state, and if sine $\theta$ is negative, a one will be stored in the flip-flop 341. The flip-flop 342, storing the second most significant digit, will be set by the translating unit, in response to the trigger pulse, to store one if the flip-flop 222 stores a one and the flip-flop 252 stores a zero or the flip-flop 222 stores a zero and the flip-flop 252 stores a one. If the flip-flops 222 and 252 both store the same digit, the flip-flop 342 will be left in its zero state. In this manner, the flip-flop 342 storing the second most significant output digit is made to store a zero if the input angle θ is in the first or third quadrant, and nd is made to store a one if θ is in the second or fourth quadrant. The outputs of the remaining flip-flops of the register 335 are set to be the same as the corresponding flip-flops of the register 331 by the translating unit 333 in response to the trigger pulse applied upon channel 334, if the input angle θ is in the first or third quadrant, and sets the register 335 in accordance with the inverse of the digits stored in the corresponding flip-flops of the register 331, if the input angle θ is in the second or fourth quadrant. In other words, if the flip-flop 222 stores a one and the flip-flop 252 stores a one, or if the flip-flop 222 stores a zero and the flip-flop 252 also stores a zero, then the translating unit 333 in response to the applied trigger pulse will store ones in the flip-flops of the register 335 representing the third most significant output digit and less significant digits if one is stored in the corresponding flip-flop in the register 331 with the remaining flip-flops in the register 335 being left in their zero states to correspond with the zero states of the corresponding flip-flops in the register 331. If, on the other hand, the flip-flops 222 and 252 of the register 331 store opposite digits indicating that the input angle θ is in the second or fourth quadrants, then the translating unit 333 in response to the enabling pulse will store ones in those flip-flops of the register 335 representing the third most significant digit and less significant digits, which correspond to flip-flops in the register 331 which store zeros, with zeros being left in the remaining ones of the flip-flops of the register 335 to correspond with the ones stored in the corresponding flip-flops of the register 331. In this manner, the digits stored in the flip-flops 292 and 322 and flip-flops corresponding to less significant digits in the register 331 are inverted and stored in the corresponding flip-flops of the register 335, in response to the trigger pulse applied to the translating unit 333 when the input angle θ is in the second or fourth quadrant.

Figure 7:
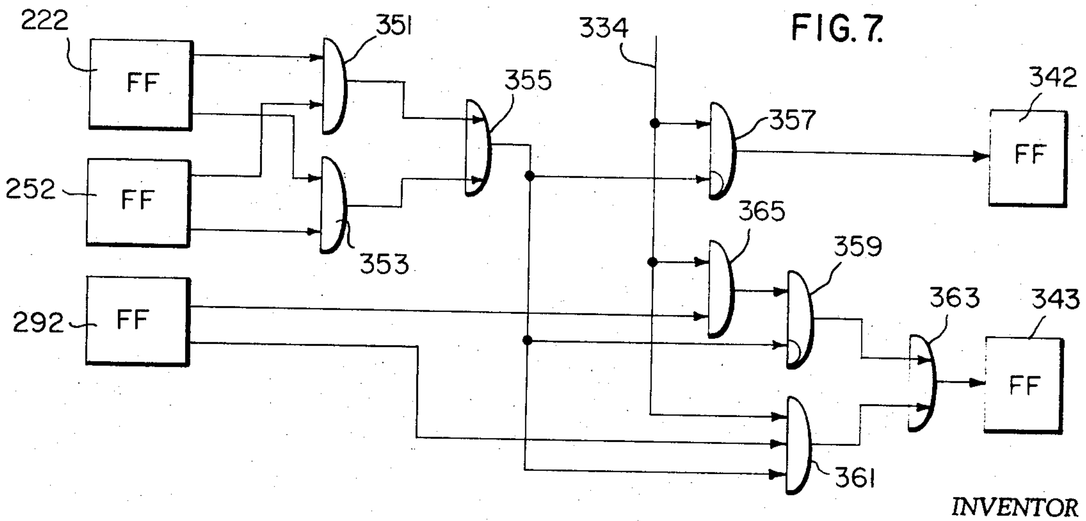
FIG. 7 is a block diagram illustrating the logic circuitry used in the system of FIG. 6.

FIG. 7 illustrates the logic of the translating unit for setting the flip-flops 342 and 343 of the register 335 in accordance with the digits stored in the register 331. An AND-gate 35 is provided to produce an output signal only if both the flip-flops 222 and 252 store ones indicating that θ is in the first quadrant. An AND-gate 353 will produce an output signal only if flip-flop 222 and 252 store zeros indicating that θ is in the third quadrant. The outputs of the AND-gates 353 and 351 are applied to an OR-gate 355 which will produce an output signal if it receives an enabling output signal from either the gate 351 or 353. Accordingly, the OR-gate 355 will produce an output signal if θ is in the first quadrant or in the third quadrant, but will not produce an output signal if θ is in the second or fourth quadrant. A normally enabled gate 357 is connected to receive the output produced by the OR-gate 355, and whenever the OR-gate 355 produces its output signal, the gate 357 will be disabled. Thus, the gate 357 will be enabled whenever θ is in the second or fourth quadrant, and will be disabled whenever θ is in the first or third quadrants. The pulse applied to the translating unit 333 over channel 334 to cause it to store the output digital number in the register 335 is applied to the gate 357. If the gate 357 is enabled, the applied pulse will pass through the gate 357 to store one in the flip-flop 342. In this manner, the flip-flop 342 is made to store a one whenever θ is in the second or fourth quadrant, but is left in its zero state whenever θ is in the first and third quadrants. A normally enabled gate 359 and a normally disabled gate 361 are also connected to receive the output of the OR-gate 355. The normally enabled gate 359 will be disabled by the output signal of the gate 355. The normally disabled gate 361 will be enabled if the gate 355 produces an output signal and the gate 361 also receives an enabling signal from the flip-flop 292 of the register 331. The flip-flop 292 will apply an enabling signal to the gate 361 if it stores one. Thus, the gate 361 will be enabled if the flip-flop 292 stores a one and θ is in the first or third quadrant. The gate 361 is connected to receive the trigger pulse applied on input channel 334 and pass this pulse, if enabled, through an OR-gate 363 to store a one in the flip-flop 343. Thus, if θ is in the first or third quadrant, and a one is stored in the flip-flop 292, a one will be stored in the corresponding flip-flop 343 of the register 335 when the enabling pulse is applied on channel 334. The flip-flop 292 also applies an enabling signal to a gate 365, which is also connected to receive the pulse applied on channel 334. The gate 365 will be enabled by the flip-flop 292 to pass the applied pulse whenever the flip-flop 292 stores a zero. A pulse passing through the gate 365 is applied to the normally enabled gate 359. Thus, a pulse will be applied to the gate 359 from the gate 365 if the flip-flop 292 stores a zero when a pulse is applied to the input channel 334. As pointed out above, the gate 359 is normally enabled and will be disabled by the output signal produced by the gate 355. Accordingly, the gate 359 will be enabled and pass the applied pulse whenever θ is in the second or fourth quadrant, but will not pass the applied pulse when θ is in the first or third quadrant. A pulse passing through the gate 359 will pass through the OR-gate 363 to store a one in the flip-flop 343. In this manner, the flip-flop 343 is made to store a one whenever the flip-flop 292 stores a zero and θ is in the second or fourth quadrant when a pulse is applied to the input channel 334. When θ is in the second or fourth quadrant, and the flip-flop 292 stores a one, the flip-flop 243 is left in its zero state. In this manner, the flip-flop 343 is set to store the same digit as the flip-flop 292 when θ is in the first or third quadrant, and set to store the opposite digit of the flip-flop 292 when θ is in the second or fourth quadrant. The logic for setting the remaining digits of the register 335 is the same as that for the flip-flop 343.

The system of he present invention can also be programmed to rotate an input vector through a predetermined digitally represented angle. In such an operation, signals representing the sine component and cosine component of the input vector would be applied to the inputs 17 and 119, respectively.

The system is programmed to rotate the input vector represented by signals representing the sine and cosine components of the vector, in effect, by calculating the new sine and cosine components of the vector, after it has been rotated. The system first performs the vector rotation in accordance with the first two digits of the input binary number. If both of these two digits are zero, then there will be no rotation in accordance with these two input digits. If the first digit is one and the second digit is a zero, then both signals will be inverted and the signal representing the inverted sine component will be stored on the amplifier 54 and the signal representing the inverted cosine component will be stored on the amplifier 53. If the second most significant digit is a one and the first most significant digit is a zero, then the system is programmed to store a signal voltage having a magnitude equal to the sine component on the amplifier 54 to represent the cosine component of the vector after rotation in accordance with the first two digits, and to store a signal equal in magnitude to the cosine component on the amplifier 53 to represent the sine component of the vector after rotation in accordance with the first two input digits. If the input signals representing the sine and cosine components of the input vectors are of the same polarity indicating that the input vector is in the first or third quadrant, then the signal voltage applied to the input 117 representing the sine component of the input vector will be inverted before being stored on the amplifier 54 to represent the cosine component of the vector after rotation in accordance with the first two digits of the input vector. The signal voltage applied to the input 119 will be stored on the amplifier 53 without inversion to represent the sine component of the vector after rotation in accordance with the first two digits. If the signal voltages applied to the inputs 117 and 119 are of the opposite polarity indicating that input vector is in the second or fourth quadrant, then the signal voltage applied to the input 117 is stored on the amplifier 54 without inversion to represent the cosine component and the signal voltage applied to input 119 is stored on the amplifier 53 after being inverted to represent the sine component of the vector after rotation in accordance with the first two digits.

If both the first two digits are ones, then a signal voltage equal in magnitude to the signal voltage representing the sine component will be stored on the amplifier 54 to represent the cosine component of the vector after rotation in accordance with the first two digits, and a signal voltage equal in magnitude to that applied to the input 119 to represent the cosine component of the input vector will be stored on the amplifier 53 to represent the sine component of the vector after rotation in accordance with the first two digits. However, in the case of the first two digits both being ones, the signal voltage stored on the amplifier 53 to represent the sine component must be inverted if the input vector is in the first or third quadrant whereas, the signal voltage stored on the amplifier 54 to represent the cosine component must be inverted if the input vector is in the second or fourth quadrant.

To invert one of the signals before storing in either one of the amplifiers 53 or 54, the signal voltage is first stored on amplifier 51 and then transferred to the selected one of the amplifiers 53 or 54. To perform the necessary rotation of the vector in accordance with the third and lesser significant digits, the system of FIG. 4 is programmed to implement the following equation:

$$(6)\qquad K\sin\alpha_{n+1}=K\sin(\alpha_n+\Delta_n)=\frac{1}{2\cos\Delta_n}[K\sin\alpha_n+K\sin(\alpha_n+2\Delta_n)]$$

$$(7)\qquad K\cos\alpha_{n+1}=K\cos(\alpha_n+\Delta_n)=\frac{1}{2\cos\Delta_n}[K\cos\alpha_n+K\cos(\alpha_n+2\Delta_n)]$$

In these equations, the angle Δ represents the value of each successive digit in the input binary number starting with the third digit in which Δ is 45°. The system is programmed to calculate the resulting values of the sine and cosine components for each successive digit in accordance with these equations 6 and 7. For example, to calculate the sine component of the vector after rotation in accordance with the input binary number, the system after first making the necessary operations to rotate the vector in accordance with the first two binary digits as described above, then adds to the signal stored on one of the amplifier 53 and 54 representing the sine component, $K\sin\alpha$, a signal representing $K\sin(\alpha+90°)$, and multiplies the resulting sum by 1/(2 cos 45°). The value for $K\sin(\alpha+90°)$ will be equal to $K\cos\alpha$ stored on the other one of the amplifiers 53 or 54. Accordingly, the system is programmed to add signals representing the sine and cosine components stored on amplifiers 53 and 54 and multiply the resulting sum times 1/(2 cos 45°). This is accomplished in the system of FIG. 4 by storing the resulting sum on the amplifier 51 with the resistor 102 selected to be in the feedback path of the amplifier 51 in order to multiply the sum by the factor of 1/(2 cos 45°). If the third digit of the input binary number is a one, then the output signal voltage of the amplifier 51 is transferred to the one of the amplifiers 53 and 54 storing the sine component of the vector and becomes a representation of the new value of the sine component of the vector after being rotated through 45°. If the third digit is a zero, then the output signal on amplifier 51 is transferred to the other one of the amplifiers to replace the voltage thereon so as to be available for use in subsequent calculation in accordance with the less significant digits. The system is then programmed to add the signal voltages stored on amplifiers 53 nd 54 and to store the resulting sum on the amplifier 51 multiplied by the factor 1/(2 cos 22.5°). If the fourth digit is a one, then the output signal voltage of amplifier 51 is transferred to the one of amplifiers 53 and 54 storing the sine component of the vector to replace the signal voltage stored thereon, and becomes the new representation of the sine component of the vector after being rotated through 22.5°. If the third digit is a zero, then the output signal voltage on amplifier 51 is transferred to the other one of the amplifiers 53 and 54 to replace the voltage thereon so as to be available for use in subsequent calculations. This process is then again repeated for each of the subsequent digits using multiplication factors of 1/(2 cos 11.25°), 1/(2 cos 5.625°) and 1/(2 cos 2.8125°)in that order. Subsequent digits of the input binary number are programmed using the factor 1/(2 cos 2.8125°) until all the digits have been programmed. After the last digit has been programmed, the signal voltage stored on the one of the amplifiers 53 and 54 storing the sine component will represent the sine component of the vector after being rotated in accordance with the input digital number. The same process is then repeated in a similar manner to determine the cosine component of the input signal.

above operations have been described for rotating the input vector in a forward direction, but the system is also obviously applicable to rotate the input vector in a negative direction. In the case of rotating the input in a negative direction, the equations implemented by the program are as follows:

$$(8)\qquad K\sin\alpha_{n+1}=K\sin(\alpha_n-\Delta_n)=\frac{1}{2\cos\Delta_n}[K\cos\alpha_n+K\sin(\alpha_n-2\Delta_n)]$$

$$(9)\qquad K\cos\alpha_{n+1}=K\cos(\alpha_n-\Delta_n)=\frac{1}{2\cos\Delta_n}[K\cos\alpha_n+K\cos(\alpha_n-2\Delta_n)]$$

Instead of calculating the cosine component after the sine component has been calculated, a second system, identical to that shown in FIG. 4, could be provided and the cosine component could be calculated simultaneously with the calculation of the sine component. Alternatively, the two components could be calculated simultaneously on the same system in a multiplex mode. This latter operation would require two more analogue hold amplifiers in addition to those shown in FIG. 4. The program for carrying out the vector rotation as described above can be provided automatically by a programming unit in a manner similar to that described with reference to FIG. 5.

The maximum theoretical error which will be generated by the system when operated as a vector rotator as described in 0.06 percent for either the sine component or the cosine component and their ratio, the output tangent function, is accurate to less than 6 arc seconds. The component accuracy can be improved to 0.0075 percent if one additional resistor having a value equal to R/cos 1.40625° is added to the system together with appropriate gates and programming to be connected into the feedback path of the amplifier 51 so as to be able to multiply this signal voltage stored on the amplifier 51 by this factor. Moreover, the error in the system does not increase significantly over wide temperature ranges. The aperture time of the system during which the input signals applied to inputs 117 and 119 can be made relatively short. Conversion to accuracy of .1 percent can be made in some cases by sampling of an AC carrier presenting the input sine and cosine components near their peaks without intermediate demodulation.

The above description is of preferred embodiments of the present invention and many modifications may be made thereto without departing from the spirit and scope of the invention, which is defined in the appended claims.

I claim:

1. A system for generating a digital number to represent an angle from input analogue signals representing the sine and cosine of said angle comprising arithmetic means for multiplying an analogue signal times 1/(2 cos 45°) and to find the algebraic sum of and difference between analogue signals, and means to control said arithmetic means to find the difference in magnitude between said input signals representing the sine and cosine of said angle and to multiply said difference times 1/(2 cos 45°), wherein said system includes polarity detecting means for sensing the polarity of an analogue signal and wherein said control means controls said polarity detecting means to sense the polarity of said input signals, and wherein said control means controls said polarity detector to determine the polarity of the difference in magnitude between said input signals.

2. A system as recited in claim 1 wherein said arithmetic means is selectively operable to multiply an analogue signal times 1/2 cos 22.5°, wherein said arithmetic means produces a first computed analogue signal representing the difference in magnitude between said input signals multiplied times 1/2 cos 45°, and wherein said control means controls said arithmetic means to find he difference between said first computed analogue signal and the one of said input signals which is of the opposite polarity from said first computed analogue signal and to multiply the resulting difference times 1/(2 cos 22.5°) to produce a second computed analogue signal.

3. A system as recited in claim 2 including means to store said computed analogue signals.

4. A system as recited in claim 2 wherein said arithmetic means is operable to multiply and analogue signals times 1/(2 cos 11.25°) and wherein said control means controls said arithmetic means to find the algebraic sum of said second computed analogue signal and the one of the analogue signals algebraically summed to obtain said second computed analogue signal which is of the opposite polarity from he second computed analogue signal and to multiply the resulting difference times 1/(2 11.25°) to produce a third computed analogue signal.

5. A system as recited in claim 4 including a plurality of storage means to store said computed analogue signals.

6. A method of determining a digital number representing an angle from input analogue signals representing the sine and cosine of said angle comprising sensing the polarities of said input analogue signals and algebraically combining said signals to produce a computed analogue signal representing the difference in magnitude between said input analogue signals multiplied by 1/(2 cos 45°), and further comprising algebraically summing said computed analogue signal with the one of said input analogue signals which is of the opposite polarity from said computed analogue signal and multiplying the resulting sum times 1/(2 cos 22.5°) to produce a second computed analogue signal representing such resulting sum multiplied by 1/(2 cos 22.5°).

7. A method as recited in claim 6 further comprising determining the polarity of said first mentioned computed analogue signal and said second computed analogue signal.

8. A method as recited in claim 6 further comprising algebraically summing said second computed analogue signal with the one of the analogue signals algebraically summed to produce said second computed analogue signal which is of the opposite polarity from said second computed analogue signal and multiplying the resulting sum times 1/(2 cos 11.25°) to produce a third computed analogue signal representing such resulting sum multiplied by 1/(2 cos 11.25°).

9. A method as recited in claim 8 further comprising determining the polarities of said computed analogue signals.

10. A method of determining the sine of the angle displaced a number of degrees represented by an input binary number from an input angle represented by first and second analogue signals representing the sine and cosine of said input angle, respectively, comprising algebraically combining said first and second analogue signals and multiplying the result by 1/(2 cos 45°) to produce a third analogue signal, algebraically summing said third analogue signal with said first analogue signal and multiplying the resulting sum times 1/(2 cos 22.5°) to produce a fourth analogue signal if the digit of said input binary number, the order of which represents 45° is zero and algebraically summing said third analogue signal with said second analogue signal and multiplying the resulting sum times 1/(2 cos 22.5°) if said digit is a one.

11. a method s recited in claim 10 further comprising algebraically summing said fourth signal with said first signal if said first mentioned digit is a zero and a second digit of said input binary number, in order of which represents 22.5° is a zero, with said third signal if said first mentioned digit is zero and said second digit is a one or if said first mentioned digit is a one and said second digit is a zero, and with said second signal if said first mentioned digit is a one and said second digit is a zero; and multiplying the resulting sum by 1/(2 cos 11.25°) to produce a fifth analogue signal.

* * * * *

UNITED STATES PATENT OFFICE
CERTIFICATE OF CORRECTION

Patent No. 3,631,233 Dated December 28, 1971

Inventor(s) Joseph V. McKenna

It is certified that error appears in the above-identified patent and that said Letters Patent are hereby corrected as shown below:

Col. 2, line 55 after "the" second occurrence insert --first quadrant. Accordingly, the system will determine, as described above, that the first two digits of the--.

Col. 3, line 76 after "of" first occurrence, delete $\phi$ and insert $\theta$.

Col. 4, line 77 after "sine" delete $\phi_n$ and insert $\phi_{n-1}$.

Col. 5, line 3 after sine delete $\phi$-1 and insert $\phi_{n-1}$.

Col. 5, line 22 after times delete $1/(2 \cos 90° \ 2^n)$ and insert $1/(2 \cos 90°/2^n)$.

Col. 5 line 66 after of delete "he inner" and insert --the linear".

Col. 7, line 8 after analogue, delete "old" and insert --hold--.

Col. 7, line 49 after the, delete "old" and insert --hold--.

Colume 8, line 45 after multivibrators delete "51" and --insert 151--.

Col. 9, line 37 after appropriate delete "end" and insert --one--.
Col. 9, line 37, "he" should read -- the --.
Col. 9, line 60 after the, first occurrence delete inner and insert --linear--.

Col. 10, line 9 after line delete "56" and insert --156--.

Col. 10, line 17 after the, first occurrence, delete "relay" and insert --delay--.

Col. 10, line 28, after "control", delete "61" and insert --161--

PO-1050
(5/69)

UNITED STATES PATENT OFFICE

CERTIFICATE OF CORRECTION

Patent No. 3,631,233 Dated December 28, 1971

Inventor(s) Joseph V. McKenna USSN 848,519 PAGE - 2

It is certified that error appears in the above-identified patent and that said Letters Patent are hereby corrected as shown below:

Col. 10, line 40 after "and" delete "be gate by" and insert --224. Gate 223--.

Col. 13, line 51, after "is", delete "negative." and insert --positive. The gate 324, being enabled by the output on channel 141 of the polarity detector 137, will be enabled if sine Ø 2 is negative.--.

Col. 15, line 41 after gate, delete "35" and insert --351--.

Col. 15, line 37 after inputs delete "17" and inserg --117--.

Col. 18, equation 8 delete [K Cos $\delta_n$ and insert [K Sin $\delta_n$.

Col. 19, line 19 after times delete 1/(2 11.25°) and insert 1/(2 cos 11.25°).

Signed and sealed this 8th day of August 1972.

(SEAL)
Attest:

EDWARD M.FLETCHER,JR.
Attesting Officer

ROBERT GOTTSCHALK
Commissioner of Patents